(12) United States Patent
Goldsmith et al.

(10) Patent No.: US 11,325,765 B1
(45) Date of Patent: May 10, 2022

(54) AUDIO EQUIPMENT WEIGHTING DEVICE

(71) Applicants: Blake Ian Goldsmith, Delray Beach, FL (US); Benny Hakim, Delray Beach, FL (US)

(72) Inventors: Blake Ian Goldsmith, Delray Beach, FL (US); Benny Hakim, Delray Beach, FL (US)

( * ) Notice: Subject to any disclaimer, the term of this patent is extended or adjusted under 35 U.S.C. 154(b) by 0 days.

(21) Appl. No.: 17/245,354

(22) Filed: Apr. 30, 2021

(51) Int. Cl.
| | |
|---|---|
| *B65D 77/04* | (2006.01) |
| *B65D 33/06* | (2006.01) |
| *B65D 33/28* | (2006.01) |
| *F16F 9/00* | (2006.01) |
| *H04R 1/02* | (2006.01) |

(52) U.S. Cl.
CPC ............. *B65D 77/04* (2013.01); *B65D 33/06* (2013.01); *B65D 33/28* (2013.01); *F16F 9/00* (2013.01); *H04R 1/026* (2013.01)

(58) Field of Classification Search
CPC combination set(s) only.
See application file for complete search history.

(56) References Cited

U.S. PATENT DOCUMENTS

| | | | | |
|---|---|---|---|---|
| 900,610 | A * | 10/1908 | Stow | A45F 3/12 |
| | | | | 224/264 |
| 2,616,467 | A * | 11/1952 | Cicero | B65D 33/28 |
| | | | | 383/16 |
| 3,059,720 | A * | 10/1962 | Matsuoka | H04R 1/345 |
| | | | | 381/420 |
| 3,935,924 | A * | 2/1976 | Nagao | D21H 13/50 |
| | | | | 181/169 |
| 4,308,094 | A * | 12/1981 | Miyoshi | D21J 3/12 |
| | | | | 162/135 |
| 4,501,401 | A * | 2/1985 | Conee | F16M 13/00 |
| | | | | 248/346.2 |
| 4,606,524 | A * | 8/1986 | Conee | F16M 13/022 |
| | | | | 248/346.06 |

(Continued)

FOREIGN PATENT DOCUMENTS

| | | |
|---|---|---|
| CN | 206422906 | 8/2017 |
| DE | 19731672 | 1/1998 |

(Continued)

OTHER PUBLICATIONS

Sand filling Premier S-series speaker stand, How?, https://forum.audiogon.com/discussions/sand-filling-premier-s-series-speaker-stand-how (printed Jul. 19, 2021).

(Continued)

*Primary Examiner* — Monica E Millner
(74) *Attorney, Agent, or Firm* — Akerman LLP (57) ABSTRACT

A weighting device for audio equipment may include a container and an outer casing. The container includes an interior volume that contains or is configured to contain a filler material and that is defined by one or more sidewalls that are impermeable to the filler material. The filler material may include a liquid, solid, slurry, or non-Newtonian fluid. The outer casing includes an interior volume configured to receive the container. The outer casing has an exterior side comprising a rubberized material, non-abrasive material, slick material, soft cloth, or non-abrading polymer material to prevent damage to the audio equipment.

17 Claims, 5 Drawing Sheets

(56) References Cited

U.S. PATENT DOCUMENTS

| | | | | |
|---|---|---|---|---|
| 5,206,466 | A * | 4/1993 | Inamiya | B32B 5/08 |
| | | | | 181/169 |
| 5,290,973 | A * | 3/1994 | Kwoh | F16F 9/006 |
| | | | | 181/199 |
| 5,298,693 | A * | 3/1994 | Heijn | A47B 81/06 |
| | | | | 181/199 |
| 5,350,147 | A * | 9/1994 | Paganus | F16M 13/00 |
| | | | | 248/346.2 |
| 5,777,947 | A | 7/1998 | Ahuja | |
| 5,866,858 | A * | 2/1999 | Dewey | H04R 1/02 |
| | | | | 181/151 |
| 5,924,661 | A * | 7/1999 | Chernack | F16M 13/022 |
| | | | | 248/188.2 |
| 5,965,249 | A * | 10/1999 | Sutton | C08J 9/40 |
| | | | | 248/562 |
| 6,186,662 | B1 * | 2/2001 | Jackson | A45C 3/00 |
| | | | | 383/117 |
| 6,330,992 | B1 * | 12/2001 | Swayhoover | F16M 13/00 |
| | | | | 248/230.8 |
| 6,367,579 | B1 | 4/2002 | Wiener | |
| 6,398,410 | B1 * | 6/2002 | Guerra | D06F 95/006 |
| | | | | 383/117 |
| 7,226,120 | B2 | 6/2007 | Yamazaki | |
| 7,290,759 | B1 * | 11/2007 | Lavrencik | F16F 15/08 |
| | | | | 267/140.11 |
| 7,946,305 | B1 * | 5/2011 | Mailman | A45B 25/22 |
| | | | | 135/16 |
| 8,292,023 | B2 * | 10/2012 | Slotte | H04R 1/2803 |
| | | | | 181/151 |
| 8,327,863 | B1 * | 12/2012 | Dupree | A45F 5/00 |
| | | | | 135/16 |
| 8,876,076 | B2 * | 11/2014 | Lee | F16M 11/105 |
| | | | | 248/346.2 |
| 8,985,268 | B2 * | 3/2015 | Wilson | H04R 1/2803 |
| | | | | 181/148 |
| 9,099,073 | B2 | 8/2015 | Papakyriacou | |
| 9,305,536 | B2 | 4/2016 | Cuylits | |
| 9,635,463 | B2 * | 4/2017 | Kawata | H04R 7/10 |
| 10,349,168 | B2 | 7/2019 | Liu | |
| 10,567,869 | B2 | 2/2020 | Cao | |
| 2001/0011695 | A1 * | 8/2001 | Hill | A45D 20/14 |
| | | | | 248/346.2 |
| 2005/0124730 | A1 | 6/2005 | Yamazaki | |
| 2006/0147081 | A1 * | 7/2006 | Mango, III | H04R 31/003 |
| | | | | 381/398 |
| 2008/0149418 | A1 | 6/2008 | Imamura | |
| 2010/0206658 | A1 | 8/2010 | Benedict | |
| 2013/0142373 | A1 | 6/2013 | Kanaya | |
| 2013/0223940 | A1 * | 8/2013 | Keaton | E02B 3/127 |
| | | | | 405/284 |
| 2013/0341118 | A1 | 12/2013 | Papakyriacou | |
| 2015/0133022 | A1 * | 5/2015 | Ushiba | A63H 3/02 |
| | | | | 446/73 |
| 2015/0235636 | A1 | 8/2015 | Cuylits | |
| 2017/0055701 | A1 * | 3/2017 | Latvis, Jr. | A47B 57/46 |
| 2018/0124502 | A1 | 5/2018 | Cao | |
| 2019/0153743 | A1 * | 5/2019 | Perreault | E04H 12/2246 |
| 2019/0208312 | A1 | 7/2019 | Liu | |
| 2019/0269956 | A1 * | 9/2019 | Henniger | A63B 21/0603 |
| 2020/0062191 | A1 * | 2/2020 | Ragner | B60R 11/02 |

FOREIGN PATENT DOCUMENTS

| | | |
|---|---|---|
| FR | 2701150 | 8/1994 |
| GB | 2362939 | 12/2001 |
| JP | 3204067 | 4/2016 |
| JP | 6476373 | 3/2019 |
| WO | 2005049982 | 6/2005 |

OTHER PUBLICATIONS

Day, A Standing Ovation: The Acoustic Revive Custom Series Loudspeaker Stands, the RST-38 and TB-38 Quartz Under-Boards, and teh RAF-48 Air Floating Board, he Acoustic Revive Chronicles, Chapter 7, https://positive-feedback.com/Issue47/acoustic_revive.htm, Jan./Feb. 2010.

KEF GFS Stand Inert Filler, https://www.amazon.com/KEF-GFS-Stand-Inert-Filler/dp/B06XFQJRF8/ref=asc_df_B06XFQJRF8/?tag=hyprod-20&linkCode=df0&hvadid=193196044279&hvpos=&hvnetw=g&hvrand=15723065835042411805&hvpone=&hvptwo=&hvqmt=&hvdev=c&hvdvcmdl=&hvlocint=&hvlocphy=9057286&hvtargid=pla-311781576681&psc=1 (printed Jul. 19, 2021).

uashifi.com The Ultimate Audio Experience, Atacama Atabites SMD-Z 7HD Inert Filler, https://usahifi.com/shop/racks-stands/accessories-racks-stands/atacama-atabites-smd-z-7hd-inert-filler/ (printed Jul. 19, 2021).

Youtube video, Understanding loudspeaker stands and why they make a world of difference, https://www.youtube.com/watch?v=jGNdJ3xl-6w&t=713s, Jan. 26, 2018.

* cited by examiner

AUDIO EQUIPMENT WEIGHTING DEVICE

FIELD OF TECHNOLOGY

The present application is directed to devices and methods of weighting audio equipment including speakers and speaker stands.

BACKGROUND

Speaker stands may be used to position speakers at optimal heights. When mounted or positioned unsecured to a stand, the speaker setup can be top heavy and sound output can cause vibrations that resonate in the hollow stand producing unpleasant reverberations. Many stand makers build one or more channels into their stands. To stabilized the stand and sound, user may add weight or fill a stand channel with a dense material. The current solution is to fill a plastic bag with sand and stuff the bag into an available channel in a column of the stand.

SUMMARY

In one aspect, a weighting device for audio equipment includes a having an interior volume containing or configured to contain a filler material. In one example, the filler material may comprise or consist of a liquid.

The interior volume may be defined by one or more sidewalls being impermeable to liquid. In one example, the filler material comprises a slurry. In a further or another example, the filler material is a non-Newtonian fluid. The non-Newtonian fluid may be selected from cornstarch slurry, metal oxide slurry, paper pulp, paint, polymer solution, shampoo, toothpaste, wet stand, sand and polymer kinetic sand mixture, concrete slurry, cement slurry, sand slurry, paint, oobleck, chalk slurry, coal slurry, detergent slurry, grease, emulsion, metal oxide slurry, oil well drilling mud, plastic melt, peat slurry, polymer solution, printing inks, quicksand, rock slurry, rubber solution, molten polymers, or starch solution.

The container may include an opening into the interior volume and a closure device for selectively closing and opening the opening. In one example, the container may impermeable to liquid and the closure device seals the opening when the opening is selectively closed with closure device. Further to the above or in another example, the weighting device includes a plurality of subunit containers containing the filler material and the interior volume of the container is dimensioned to receive the plurality of subunit containers through the opening.

An exterior side of the container comprises a rubberized material, non-abrasive material, slick material, soft cloth, or non-abrading polymer material that prevents damage to the audio equipment.

The weighting device may include a retriever attached to the weighting device. The retriever may include an elongate material extending or extendable from the weighting device configured to be grasped by a user to manipulate a position of the weighting device. In one example, the elongate material comprises an extendable tab or string. In one example, the retriever is attached to at least one end of the container.

The weighting device may include an outer casing having an interior volume configured to receive the container. In one example, an exterior side of the outer casing comprises a rubberized material, non-abrasive material, slick material, soft cloth, or non-abrading polymer material.

In one example, the retriever is attached to at least one end of the outer casing.

In various embodiments, the audio equipment is a speaker stand and the use location is a channel within the speaker stand or the audio equipment is a speaker and the use location is a cavity within the speaker.

In another aspect, a weighting device for audio equipment includes a container and a retriever. The container may have one or more sidewalls defining an interior volume configured to contain a filler material. An exterior side of the container may include a rubberized material, non-abrasive material, slick material, soft cloth, or non-abrading polymer material. The retriever may be attached to the container and include an elongate material that extends from the container and that is configured to be grasped by a user to manipulate a position of the container.

The one or more sidewalls may be liquid impermeable. In one example, the filler material is or acts as a non-Newtonian fluid. The container may include an opening into the interior volume and a closure device for selectively closing and opening the opening. The closure device may be configured to seal the opening when the opening is selectively closed with closure device.

In one example, the weighting device may include a plurality of subunit containers containing the filler material. The interior volume of the container may be dimensioned to receive the plurality of subunit containers through the opening.

In one example, the audio equipment is a speaker stand and the use location is a channel within the speaker stand or the audio equipment is a speaker and the user location is a cavity within the speaker.

In another aspect, a weighting device for audio equipment includes a container and an outer casing. The container includes one or more sidewalls defining an interior volume containing or configured to contain a filler material. The filler material may include a slurry and the one or more sidewalls may be impermeable to the filler material. The outer casing may include an interior volume configured to receive the container. An exterior side of the outer casing may include a rubberized material, non-abrasive material, slick material, soft cloth, or non-abrading polymer material.

In one example, the slurry is or acts as a non-Newtonian fluid. The container may include an opening into the interior volume and a closure device for selectively closing and opening the opening. The closure device may seal the opening when the opening is selectively closed with closure device.

The weighting device may include a plurality of subunit containers containing the filler material. The interior volume of the container may be dimensioned to receive the plurality of subunit containers through the opening.

The weighting device may include a retriever attached to the outer casing. The retriever may include an elongate material that extends from the outer casing and that is configured to be grasped by a user to manipulate a position of the weighting device. In one example, the elongate material includes an extendable tab or string.

The audio equipment may be a speaker stand and the use location a channel within the speaker stand or the audio equipment may be a speaker and the user location a cavity within the speaker.

In still another aspect, a method of weighting audio equipment includes positioning a weighting device as described above and elsewhere herein within a channel of a speaker stand.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

DESCRIPTION

A loudspeaker should radiate its energy as precisely as possible. Vibrations will cause the speaker to move with the music, thus resulting in a loss of sound energy, and decreasing sound quality. If the stand that the speaker is mounted on is firm and unable to vibrate (or vibrate less), less of the sound energy will be converted to vibrations, and thus sound quality is improved.

According to various embodiments, the present disclosure describes a weighting device to stabilize speaker stands or the stands of other equipment that generates sound by weighing them down.

Figure 1:
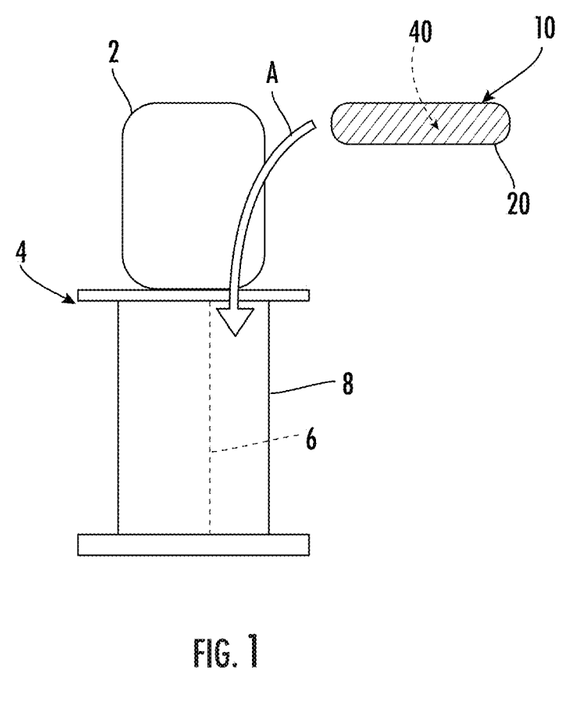
FIG. 1 illustrates a weighted device and speaker stand according to various embodiments described herein.

With reference to FIG. 1, the weighting device 10 may be configured to provide additional mass and thereby weigh down sound producing music equipment, such as a speaker 2, and/or structures upon which sound producing music equipment is positioned, such as speaker stands 4. The weighting device 10 may provide additional weight at one or more locations and be configured to minimize vibration, enhance resonance, provide stability, and/or improve sound quality.

The weighting device 10 may include a container 20 configured to contain filler material 40. The weighting device 10 may be structured and/or dimensioned for positioning within a speaker stand channel 6 (as indicated by arrow A) to provide stabilization and acoustic benefit, or minimal adverse acoustic effect. The channel 6 may typically extend within a column 8 of the speaker stand 4; however, the weighting device 10 may be similarly positioned within channels 6 located elsewhere with respect to the speaker stand 4 or otherwise positioned to apply its weight to the speaker stand 4.

While a speaker stand 4 including a channel 6 within a vertically extending or extendable column 8 is shown in the illustrated example, in other embodiments, the weighting device 10 may be used in other audio equipment and structures that generate sound or that support such sound generating equipment or structures, such as speakers, speaker towers, speaker boxes, instruments, and the like. That is, it is to be understood that descriptions herein with respect to weighting of a speaker stand 4 with the weighting device also apply to weighting sound producing equipment and other structures for supporting speakers. For example, the weighting device 10 may be positioned within a channel, cavity, tray, or on top of a speaker box.

With further reference to FIGS. 2A-10, wherein like numbers indicate like features, the weighting device 10 may include one or more containers 20 for containing filler material 40. The container 20 may include one or more sidewalls 22 defining an interior volume 22 for containing filler material 40. In some embodiments, the container 20 may be impermeable and/or leak proof with respect to the filler material 40. For example, the sidewalls 22 may be liquid impermeable such that a liquid filler material 40 will not permeate the sidewalls 22 when contained within the interior volume 22 of the container 20. The container 20 may include an exterior side 30 including one or more sides 23, which may include or extend between ends 21a, 21b, depending on the shape of the container 20.

The container 20 may be provided in various sizes and/or shapes. The example containers 20 illustrated in FIGS. 2A-8 have elongate, oblong, tubular, or snake-like shapes. However, containers 10 may be provided in other shapes such as spherical, cubed, cone, prism, tetrahedron, cuboid, pyramid, multi-shaped, or other suitable shape. Containers 20 may be provided in various cross-sections such as triangular, quadrilateral, polygon, geometric or non-geometric, or free-form.

The container 20 may be sealed or sealable. In one example, the container 20 includes an opening 26 that may be selectively sealed to prevent filler material 40 from escaping the interior volume 24 of the container 20. As described in more detail below, in some configurations, the filler material 40 may include a liquid and/or small particles (about 1 nm and above). In some embodiments, the container 20 or sidewalls 22 thereof may be impermeable or leak proof with respect to such liquid and/or small particles. In an above or another embodiment wherein the container 20 includes an opening 26, the container 20 may be sealed or sealable to prevent leakage of the liquid and/or small particle filler material 40.

In various embodiments, the container 20 may be sized and/or shaped to fit within a channel 6 or other space in which it is to be positioned during use. For example, the container 20 may be provided in customized shapes and/or dimensions configured to be positioned in a specified channel or channel dimension or be conformable to fit within a standard or custom sized speaker channel, e.g., a channel having a height about 6 in., about 8 inches, about 10 inches, about 12 inches, about 14 inches, about 16 inches, or greater with a cross-section width of about 0.5 inches, about 1 inch, about 1.5 inches, about 2 inches, about 2.5 inches, about 3 inches, about 3.5 inches, about 4 inches, about 4.5 inches, about 5 inches, about 5.6 inches, about 6 inches, about 7 inches, or greater. The container 20 may substantially occupy the channel and/or snuggly fit within the channel 6 as to not audibly rattle against sidewalls of the channel 6 when sound is output. In one embodiment, the container 20 may be conformable to the channel 6 or portion thereof. For example, the container 20, sidewalls 22, and/or exterior side 30 may be formed of flexible, bendable, or deformable material allowing the shape of the container 10 to be modified for optimum use. In various embodiments, the container 20 comprises canvas, cotton, polyester, rayon, soft cloth, vinyl, plastics, rubber, synthetic rubber, rubber-like materials, fabric, rubberized fabric, elastics or elastomeric materials, combinations thereof, and/or other suitable materials.

The container 20 may be configured for durability to prevent leakage and/or spillage of filler material 40. An exterior side 50 of the weighting device 10 may include a canvas, rubberized material, non-abrasive material, slick material, soft cloth, non-abrading polymer, plastic, vinyl, velvet, cloth, fabric, plush material, or the like configured to prevent damage to the channel 6 or other location where it is placed during use. In some embodiments, the exterior side 50 of the weighting device 10 comprises an exterior side 30 of the container 20. As explained in more detail below, in some embodiments, the weighting device 10 further includes an outer casing 60 (see, e.g., FIG. 10) configured to receive the container 20 wherein the exterior side 50 of the weighting device 10 comprises an exterior side 70 of the outer casing 60. In some embodiments, an exterior side 50 of the weighting device 10 may be designed to provide an aesthetically pleasing appearance.

Figures 2A, 2B:
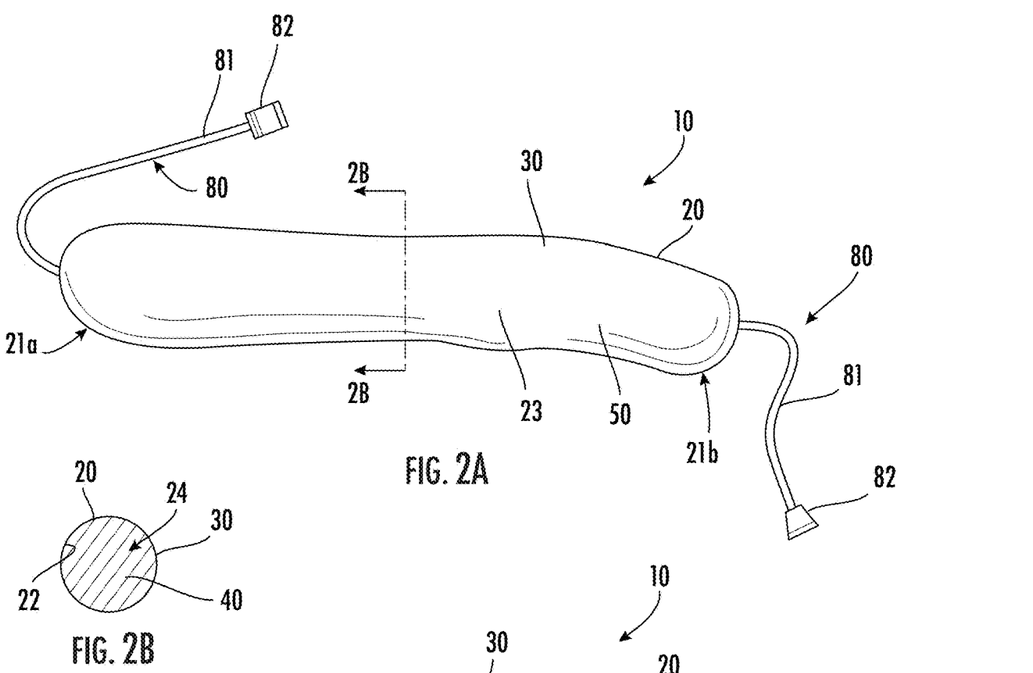
FIG. 2A illustrates a container of a weighted device according to various embodiments described herein.
FIG. 2B illustrates a cross-section view of the container shown in FIG. 2A taken across section line 2B according to various embodiments described herein.

With particular reference to FIGS. 2A & 2B, the container 20 may be enclosed and provided with filler material 40 enclosed therein. As noted above, the container 20 may be sealed and/or impermeable to the filler material 40 to prevent the filler material 40 from spilling or leaking from the interior volume 24 of the container 20 when contained therein. The illustrated container 20 may be referred to as a bladder and may be constructed from a plastic, rubber, polymer, fabric, rubberized fabric, or other material suitable material, such as any of those described herein, for containing the filler material 40.

In various embodiments, the weighted device 10, or container 20 thereof, may be provided pre-filled with filler material 40, pre-filled with removable filler material that may be exchanged with same of different filler material 40 to refill the container 20, or empty and configured to be filled with a filler material 40. For example, with particular reference to FIGS. 3-8, the container 20 may include an opening 26 through which filler material (not shown) may be provided into and out of the interior volume 22 of the container 20. The opening 26 may be provided along a side 23, ends 21a, 21b, upper portion, lower portion, or combination thereof. A closure device 28 may be provided to close the opening 26, which, in some embodiments, may seal the interior volume 24. In various embodiments, the illustrated containers 10 may be constructed from a plastic, rubber, polymer, fabric, rubberized fabric, or other material suitable material, such as any of those described herein, for containing the filler material 40.

Figure 3:
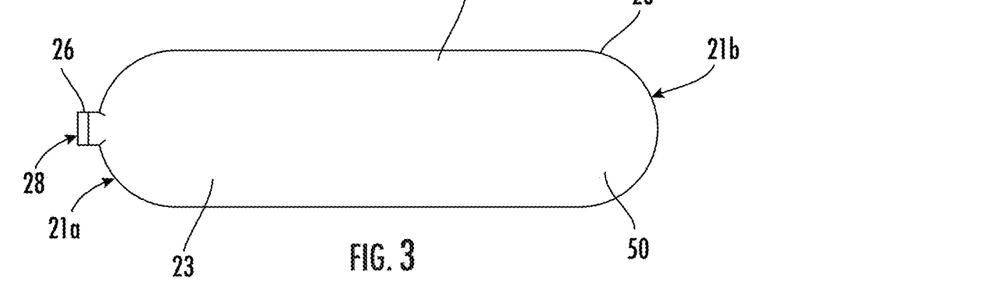
FIG. 3 illustrates a container of a weighted device according to various embodiments described herein.

In the example shown in FIG. 3, the closure device 28 comprises a cap 31 positionable over the opening 26. The cap 31 may snap over the opening 26 or may otherwise mate, e.g., via a threaded connection, with the opening 26. The opening 26 is shown at an end of the container 20. In other embodiments, the opening 26 may be provide along one or more sides 23 and/or one or more ends 21a, 21b of the container 20.

Figure 4:
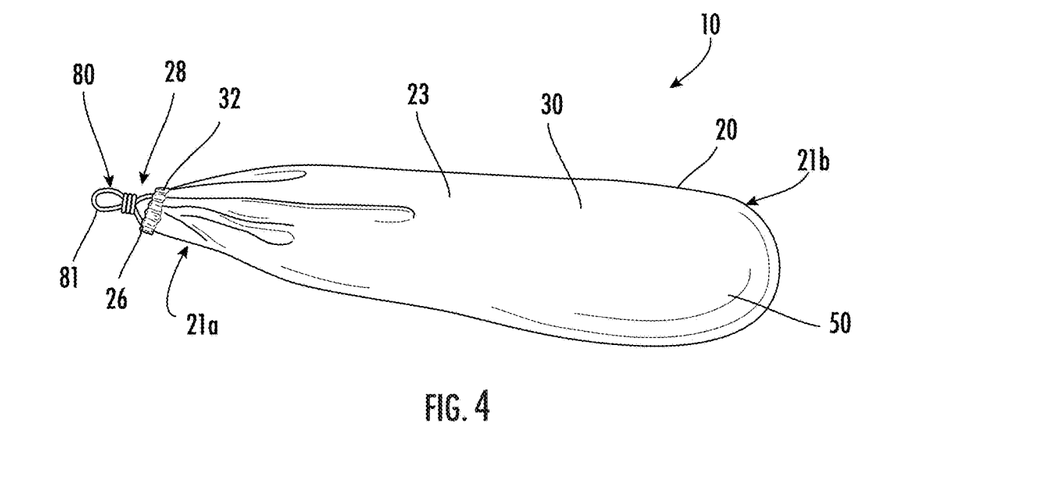
FIG. 4 illustrates a container of a weighted device according to various embodiments described herein.

In the example shown in FIG. 4, the closure device 28 comprises a drawstring 32 that threads around the opening 26 and that may be used to cinch and uncinch the opening 26. The opening 26 is shown at an end of the container 20.

In other embodiments, the opening 26 may be provided along one or more sides 23 and/or one or more ends 21a, 21b of the container 20.

Figure 5:
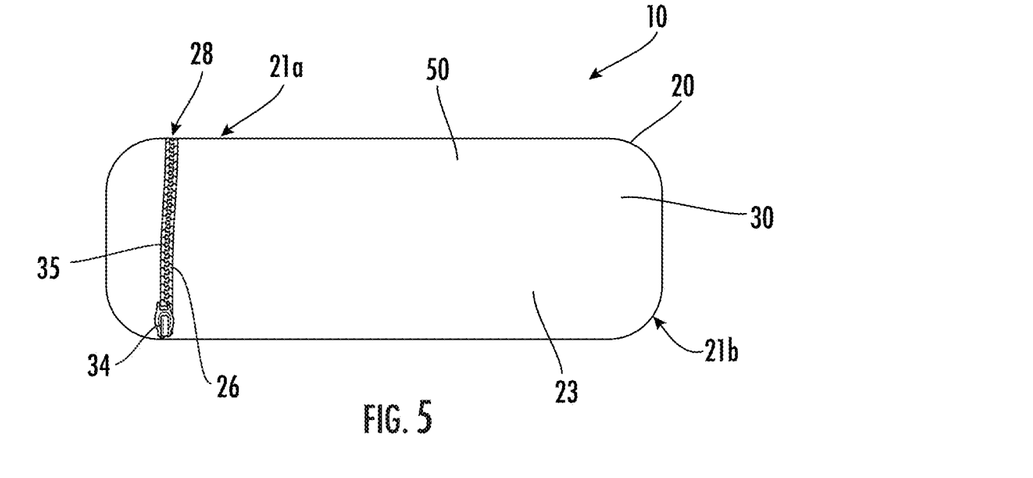
FIG. 5 illustrates a container of a weighted device according to various embodiments described herein.

In the example shown in FIG. 5, the closure device 28 comprises a zip fastener 33 having rows of teeth operatively coupled to a slider 34 that can be translated along the rows to mesh the teeth together to close the opening 26 and thereafter separate the teeth to reveal the opening 26. The opening 26 is shown at an end of the container 20. In other embodiments, the opening 26 may be provide along one or more sides 23 and/or one or more ends 21a, 21b of the container 20.

Figure 6:
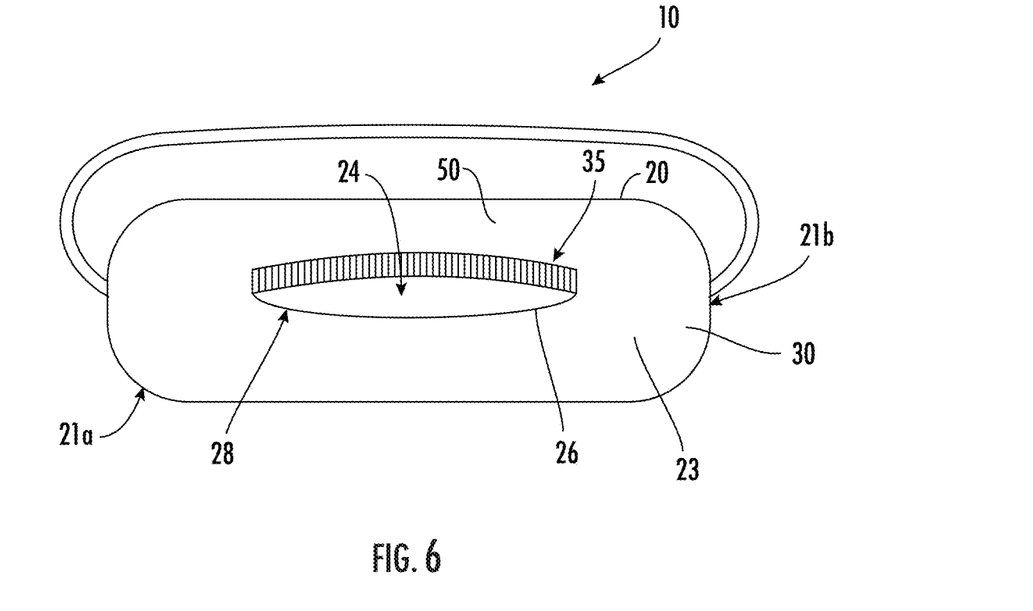
FIG. 6 illustrates a container of a weighted device according to various embodiments described herein.

In the example shown in FIG. 6, the closure device 28 comprises hook and loop strips 35 configured to attach to close the opening 26 and thereafter be separated to reveal the opening 26. The opening 26 is shown along a side 23 of the container 20. In other embodiments, the opening 26 may be provided along one or more other side 23 locations and/or one or more ends 21a, 21b of the container 20.

Figure 7:
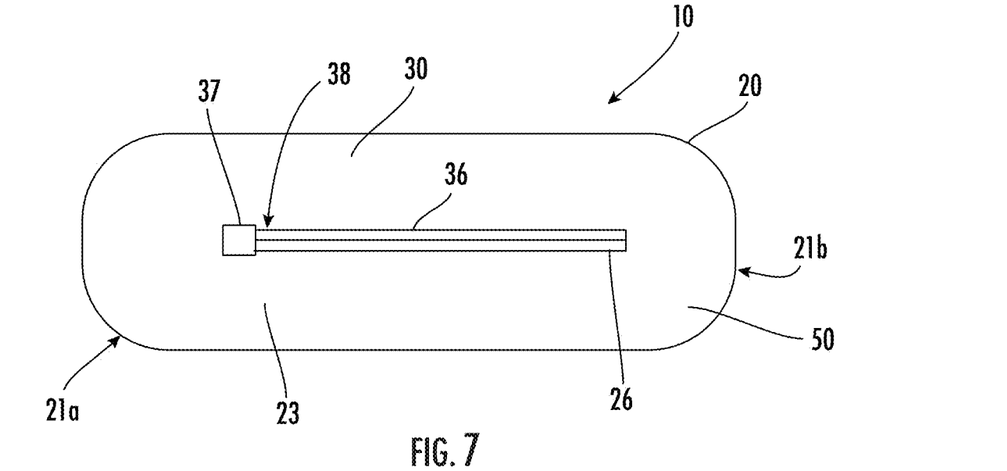
FIG. 7 illustrates a container of a weighted device according to various embodiments described herein.

In the example shown in FIG. 7, the closure device 28 comprises a resealable zipper 36 having opposing sides that when interfaced and compressed together, close the opening 26, and that may be thereafter separated to reveal the opening 26. In this example, a slider 37 is provided that is operably coupled to the zipper 36 and translatable along the opposing sides of the zipper 36 to interface and compress as well as separate the opposing sides of the zipper 36. The opening 26 is shown along a side 23 of the container 20. In other embodiments, the opening 26 may be provided along one or more other side 23 locations and/or one or more ends 21a, 21b of the container 20.

Figure 8:
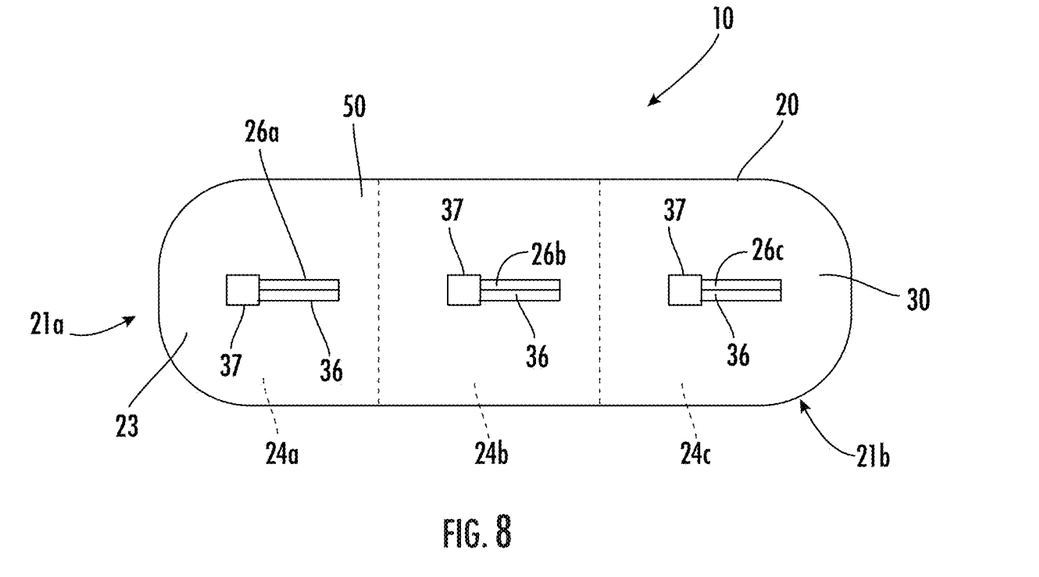
FIG. 8 illustrates a container of a weighted device according to various embodiments described herein.

With particular reference to FIG. 8, in various embodiments, the container 20 may include multiple openings 26a, 26b, 26c. In one example, multiple openings 26a, 26b, 26c may be provided to a same interior volume of the container 20. In the illustrated embodiment, each opening 26a, 26b, 26c provides an opening to separately defined interior volume 24a, 24b, 24c of the container 20. Each opening 26a, 26b, 26c is associated with a closure device 28 comprising a resealable zipper 36 and slider 37 similar to that described above with respect to FIG. 7. In other examples, different sized openings 26a, 26b, 26c and/or different closure devices 28 or combinations of closure devices 28 may be utilized. The interior volumes 24a, 24b, 24c may define same or different sized volumes. In various embodiments, the interior volumes 24a, 24b, 24c may be used to contain same or different filler material 40. Multiple interior volumes 24a, 24b, 24c may allow customization of the space occupied by the container 20, weight location, filler material composition or distribution, and/or sound dampening properties and/or characteristics.

The container 20 may container one or more filler materials 40. Filler materials 40 may be configured to provide weight to the weighting device 10. In use, the weighted property of the weighting device 10 decreases risk of sound producing music equipment and/or structures upon which sound producing music equipment is positioned toppling over as well as decreasing risk of damage to audio equipment or personal injury due to the unstable equipment. In some embodiments, the filler material 40 is non-toxic and/or non-corrosive to prevent harming users or equipment during handling, shipping, or in the event of accidental spillage or ingestion.

The filler material 40 will typically be a solid, liquid, or combination thereof. The filler material 40 may comprise or consist of a suspension, gel, emulsion, slurry, or solid-liquid mixture. In various embodiments, the filler material 40 is selected from a fluid, a non-Newtonian fluid, a gel, water, buck shot, solid rubber or rubber equivalent, sand-liquid mixture, or concrete.

Filler materials 40 may also be selected to dampen vibrations. All solid materials, regardless of particle size or shape, produce some amount of air trapping, allowing undesirable vibration and resonation. In various embodiments, the filler materials 40 may be selected to minimize, or preferably, eliminate trapped air within the filler material 40 and/or between the filler material 40 and the sidewall 22 of the container 20 defining the interior volume 24 of the container 20 containing the filler material 40. In some embodiments, the filler material 40 may contact sides of the container defining the interior volume of the container within which the filler material 40 is retained. In one embodiment, the filler material 40 may closely contact the sidewall 22 within the container such that little or no air gaps are present along the sidewall 22.

Additionally or alternatively to the above, in various embodiments, the filler material 40 may include materials and/or regions within the container 20 having densities, viscosities, and/or liquid/solid characteristics. For example, the filler material 40 may include a matrix, honeycomb, or otherwise structured portion that includes voids or pockets. The void or pocket regions within the defining filler material 40 portion may be further filled with another filler material 40 portion including or consisting of one or more gases, liquids, semi-solids, and/or solid filler materials 40 having different physical properties and/or characteristics, such as density or viscosity, than the surrounding filler material 40 portion.

As introduced above, in some embodiments, the filler material 40 may comprise or consist of a liquid or be in a liquid state in typical use to minimize trapped air within the container 20. For example, the filler material 40 may include liquid, a suspension, solid-liquid mixture, gel, or slurry. Additionally or alternatively, the weighting device may comprise or consist of a non-Newtonian fluid filler material 40 having viscosity dependence on stress applied to the fluid. For example, the filler material 40 may include a non-Newtonian fluid or material that acts as a non-Newtonian fluid selected from one or more pseudoplastic, dilatant, thixotropic, or rheopectic fluids. In various embodiments, the filler material 40 may comprise or consist of a cornstarch slurry, metal oxide slurry, paper pulp, paint, polymer solution, shampoo, toothpaste, wet stand, a combination of sand and polymer kinetic sand (e.g., 98% sand, 2% polydimethylsiloxane), concrete slurry, sand slurry, ketchup, salt solution, salt suspension, paint, oobleck, silicone polymer putty (e.g., SILLY PUTTY® (about 65% dimethylsiloxane (hydroxy-terminated polymers with boric acid), about 17% silica (crystalline quartz), about 9% Thixatrol ST (castor oil derivative), about 4% polydimethylsiloxane, and about 1% decamethyl cyclopentasiloxane, glycerine, and titanium dioxide)), adhesives, biological fluid, cement slurry, chalk slurry, chocolate, coal slurry, detergent slurry, food sauces, grease, emulsion, hand cream, margarine, mayonnaise, metal oxide slurry, oil well drilling muds, plastic melts, peat slurry, polymer solutions, printing ink, quicksand, rock slurry, rubber solutions, molten polymers, starch solutions, wet beach sand, or other material having liquid characteristics when not under stress, but temporarily changing the liquid characteristics toward solid characteristics, e.g., increase in viscosity, in response to force or stress. Utilization of filler materials 40 that are or act as non-Newtonian fluids as filler material 40 may alter transmission of vibration in response to stress. For example, stray vibration energy acting on the fluid will be inefficiently transmitted through the filler material 40. Therefore, the less efficient the filler material 40 is to transmitting stray vibration energy, the more effective the dampening effect of the filler material 40.

In some embodiments, the filler material 40 includes or consists of a Newtonian fluid whose viscosity is constant, independent of force, such as organic solvents, water, alcohols, oils, silicone oils, mineral oil, light-hydrocarbon oils, sugar water, sugar alcohols, or glycerol.

As introduced above, the filler material 40 may be contained in the container 20 within one or more interior volumes 24 thereof. The container 20 may be provided or sold pre-filled with the filler material 40 within the container 20. In one example, such a container 20 pre-filled with filler material 40 may be enclosed, i.e., lacking a selectably openable opening 26 configured to provide reasonable access to the interior volume 24 under normal usage. In another example, such a container 20 may include an opening 26 to the interior volume 24 to provide access to a user via a selective operation of a closure device 28 to open and close the opening 26. In one embodiment, a container 20 having an opening 26 and closure device 28 may be provided or sold without filler material 40 within the interior volume 24. Utilizing the opening 26 in containers 20 so equipped, a user may selectively remove, add, replace, exchange, mix, combine, and/or interchange filler materials 40 to suit a desired application.

Figure 9:
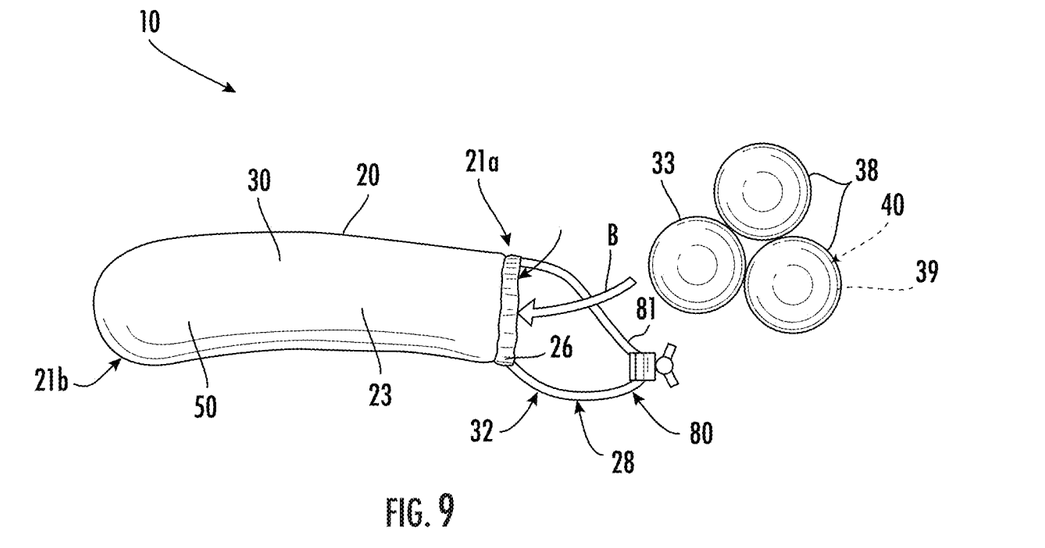
FIG. 9 illustrates a sub-container containing filler material of a weighted device according to various embodiments described herein.

With reference to FIG. 9, in some embodiments, the filler material 40 may be provided in subunit containers 38. Subunit containers 38 will typically be smaller than the container 20 described above and may be sized such that one or a plurality of the subunit containers 38 may be securely received within the interior volume 24 of a container 20. Subunit containers 38 may include an interior volume 39 for containing filler material 40, which may include any filler material 40, such as those described herein. Subunit containers 38 may be fabricated with materials such as those described above and elsewhere herein with respect to containers 20. In some embodiments, subunit containers 38 may be leakproof, liquid impermeable, and/or sealed or sealable.

Subunit containers may be provided or sold pre-filled or without filler material within their respective interior volumes 39. While the illustrated subunit containers 38 are enclosed, in some embodiments, subunit containers 38 may include openings and closure devices similar to those described herein with respect to containers 20.

As shown in FIG. 9, a plurality of approximately spherical subunit containers 38 having a diameter between about 1 inch to about 3 inch, approximately the size of a footbag, containing filler material 40 are configured for being received through the opening of the container 20 and into the interior volume 24 thereof. Larger or smaller subunit containers 38 could also be used when receivable within the container 20. The container 20 has a snake-like shape with a length dimension to receive a plurality of the subunit containers 38.

A user may insert the subunit containers 38 within the interior volume 24 through the opening 26 of the container 20 and then close the opening 26 with the closure device 28 (as indicated by arrow B). In this way, the user may achieve a desired weight, size, and/or filler material 40. Subunit containers 38 may be provided in various shapes such as spherical, cubed, cone, prism, tetrahedron, cuboid, pyramid, multi-shaped, or other suitable shape.

In another embodiment, subunit containers 38 may be inserted directly into an outer casing 60. In one embodiment, subunit containers 38 may include attachment structures configured to couple subunit containers 38. For example, a plurality of subunit containers 38 couple together for insertion into a container 20 and/or outer casing 60.

The illustrated container 20 is similar to that described above with respect to FIG. 4; however, other container 20 may be used, such as those described above with respect to FIGS. 2, 3, & 5-8. In some embodiments, the container 20 and/or subunit containers 38 may be sized to position the subunit containers 38 within the interior volume 24 of the container 20 in other configurations, such where one or more of the subunit containers 38 contacts three or more other subunit containers, e.g., in multiple rows of two or more subunit containers 38 or haphazardly.

Figure 10:
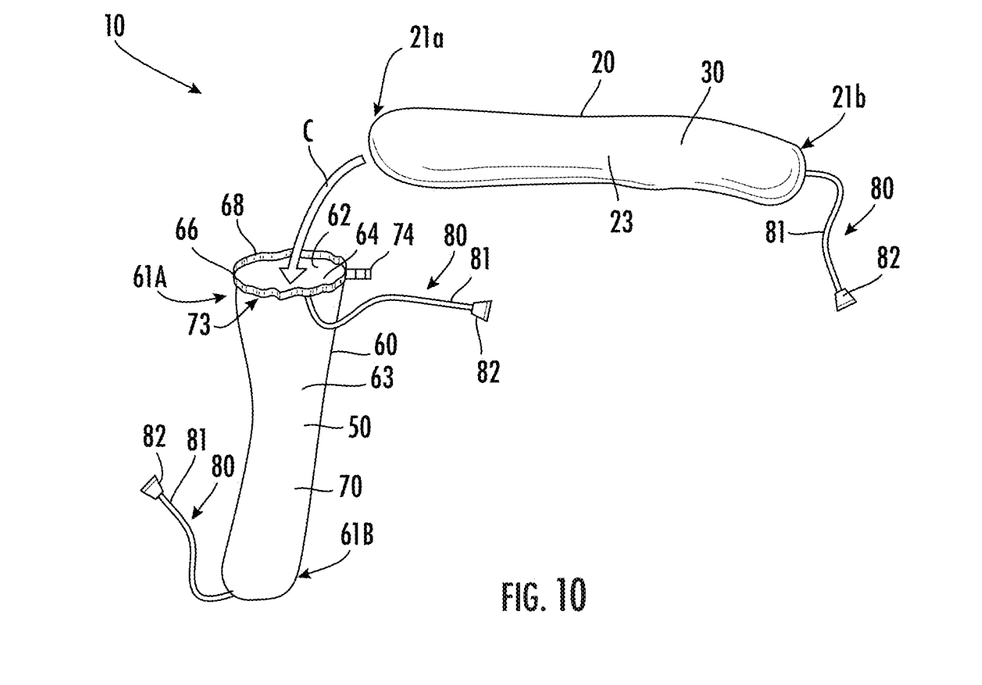
FIG. 10. illustrates a weighted device including an outer casing according to various embodiments described herein.

In various embodiments, with particular reference to FIG. 10 and as introduced above, the weighting device 10 may include an outer casing 60. The outer casing 60 may include an exterior side 70 including one or more sides 63, which may include or extend between ends 61a, 61b, depending on the shape of the outer casing 60. The outer casing 60 may include one or more sidewalls 62 defining an interior volume 64 for receiving one or more containers 20. An opening 66 may be provided into the interior volume. In some embodiments, an optional closure device 68 operable to allow a user to selectively close and reveal the opening 66 may be provided. For example, the outer casing 60 may include a closure device as described herein with respect to the container 20. As shown, the closure device 68 includes a zip fastener 73 and slider 74 similar to that described above with respect to FIG. 5; however, other closure devices 68 may be used. The one or more openings 64 may be provided along one or more sides 63 and/or ends 61a, 61b of the outer casing 60. The outer casing 60 is configured to selectively receive the container 20 within its interior volume 64. For example, a user may insert the container 20 through opening 66 and into the interior volume 64 of the outer casing 60 (as indicated by arrow C). The user may then close the opening 66 with the closure device, e.g., manipulate slider 74 to move the same in a closing direction along the zipper fastener 73. To remove the container 20, the user may open the opening 66 with the closure device, e.g., manipulate slider 74 to move the same along the zipper faster in an opening direction opposite the closing direction, and then remove the container 20.

The outer casing 60 may be provided in various sizes and/or shapes. The size and/or shape of the outer casing 60 may correspond with that of one or more containers 20 it is configured to receive and/or a channel or other location where the weighting device 10 is to be used. In the illustrated embodiment, the outer casing 60 has elongate, oblong, tubular, or snake-like shapes; however, other shapes may be used such as spherical, cubed, cone, prism, tetrahedron, cuboid, pyramid, multi-shaped, or other suitable shape.

In various embodiments, the outer casing 60 may be provided in customized shapes and/or dimensions configured to be positioned in a particular use location, such as a channel. The outer casing 60 when together with the container 20 may be sized and/or shaped to substantially occupy the use location as to not audibly vibrate against interfacing structures of the use location. In one embodiment, the outer casing 60 is conformable to the use location or portion thereof. For example, the outer casing 60, sidewalls 62, and/or exterior side 70 may be formed of flexible, bendable, or deformable material allowing the shape of the outer casing 60 modified for optimum use. In some embodiments, the outer casing 60, sidewalls 62, and/or exterior side 70 may be provided in dimensions configured to correspond to a use location, such as dimensions of a channel. The dimensions may correspond to all or a portion of the available space associated with the use location.

In various embodiments, the outer casing 60 is made from canvas, cotton, polyester, rayon, soft cloth, vinyl, plastics, rubber, synthetic rubber, rubber-like materials, fabric, rubberized fabric, elastics or elastomeric materials, combinations thereof, and/or other suitable materials. In some embodiments, the outer casing 60 may be impermeable to liquids and/or small particles (about 1 nm and above) to provide an additional layer of protection from leakage. In some embodiments, the sidewalls 62 and/or exterior side 70 of the outer casing 60 may be flexible, soft, and/or pliant to absorb sound waves and vibrations without audibly vibrating itself or against the audio equipment or structure into or onto which is placed in use.

The exterior side 70 of the outer casing 60 may form all or a portion of the exterior side 50 of the weighting device 10 and may include, for example, a rubberized material, non-abrasive material, slick material, soft cloth, non-abrading polymer, plastic, vinyl, velvet, cloth, fabric, plush material, or the like therealong that is configured to prevent damage to a use location. In some embodiments, an exterior side 50 of the weighting device 10 may be designed to provide an aesthetically pleasing appearance. For example, the exterior side 70 of the outer casing 60 may include designs and/or colors.

In various embodiments, the weighting device 10 may optionally include one or more retrievers 80 (see, e.g., FIGS. 2, 4, 6, 9, & 10). A retriever 80 may be attached to a container 20 or outer casing 60 and be configured to be grasped by a user to insert, remove, and/or manipulate a position of the weighting device 10 with respect to a use location. For example, a user may grasp the retriever 80 to lower the weighting device 10 into a channel and thereafter grasp the retriever 80 to raise the weighting device 10 out of the channel. The retriever 80 may include an elongate material 81, such as a tab or string, extendable from the weighting device 10. Various retriever configurations may be used. For example, the elongate material 81 may attach to one or more locations along the weighted device 10, e.g., one or more ends 21a, 21b, 61a, 61b or one or more sides 23, 63 of a container 20 and/or outer casing 60. In the example illustrated in FIG. 2A, two retrievers 80 are shown, each attached to an end 21a, 21b of a container 20. In the examples, illustrated in FIGS. 4 & 9, a retriever 80 is shown attached to an end 21a of a container 20 and also provided in combination with a closure device 28. In the example illustrated in FIG. 6, a retriever 80 is shown attached between to ends 21a, 21b of a container 20. In the example illustrated in FIG. 10, two retrievers 80 are shown, each attached to an end 61a, 61b of an outer casing 60 and another retriever 80 is shown attached to an end 21b of a container 20. In some embodiments, the retriever 80 includes a grip 82, such as a tab or knob, coupled to the elongate material 81 to assist the user in gripping the retriever 80. In one example, the elongate material 81 may include a loop to assist the user in gripping the retriever 80 (see, e.g., FIG. 4). It will be appreciated that the various retrievers 80 and retriever attachment points described and shown in the examples may be applied equally to containers 20 and outer casings 60.

In various embodiments, a weighting device includes a container, a filling material within the container, and an outer casing within which the container positions designed to weigh down sound producing music equipment and/or their stands and minimize vibration, enhance resonance, increase stability, and improve sound quality. In one example, the container comprises a bladder and the filler material comprises a non-Newtonian fluid, gel, water, buck shot, solid rubber, concrete, or a solid material. The outer casing may be constructed from canvas, rubberized material, or permeable sleeve.

Embodiments described herein, may include a liquid or small particle impermeable container, such as a bladder, having a special shape designed to fill a speaker stand cavity. The container may contain a specific filler material such as a non-Newtonian fluid, sand, buckshot, BBs, etc., used to weight down the weighting device. The container may be sealed to eliminate the filler material or particulate matter from the filler material from contaminating the speaker stand. The container may be further encapsulated or encased by a more aesthetically pleasing outer casing that may be made of canvas, rubberized material, plastic, or any other suitable material. The outer casing need not be liquid, fluid, or small particle impermeable. The outer casing may be constructed in a way that it holds multiple, smaller containers and/or subunit containers. In this fashion, the user can acquire an arbitrary amount of "filler bladders" and fill the casing, depending on the size of the speaker stand. A drawstring, pull-tab, or other retriever can be attached to the outer casing and/or container to easily retrieve the outer casing when the user no longer wants to weigh down the stand. An exterior side of the outer casing may be rubberized or include soft materials to minimize or eliminate damage to the interior of the speaker stand due to abrasion or friction with loose material.

In one example, the weighting device includes a durable container containing or configured to contain a filler material. The container may be leak proof with respect to liquid or very small particles (about 1 nm and above) and an outer casing that is configured to contain the container. The outer casing may be aesthetically pleasing in shape, color, and/or design. The outer casing may provide an exterior side of the weighting device that protects the audio equipment or structure into or onto which is placed in use. For example, the exterior side of the casing material may be made of canvas, rubberized material, non-abrasive material, slick material, soft cloth, non-abrading polymer, plastic, vinyl, velvet, cloth, fabric, plush material, or other material that avoids damage to the audio equipment or structure. The outer casing may include a retriever comprising an elongate material configured to allow a user to manipulate the position of the weighting device, insert the weighting device, and/or remove the weighting device from a use location.

In one embodiment, the weighting device may include a weighted structure. The weighted structure may comprise a solid material shaped to fit within a speaker stand channel. The weighted structure may be sized and dimensioned to fit or be conformable to fit within a standard or custom sized speaker channel, e.g., a channel having a height about 6 in., about 8 inches, about 10 inches, about 12 inches, about 14 inches, about 16 inches, or greater with a cross-section width of about 0.5 inches, about 1 inch, about 1.5 inches, about 2 inches, about 2.5 inches, about 3 inches, about 3.5 inches, about 4 inches, about 4.5 inches, about 5 inches, about 5.6 inches, about 6 inches, about 7 inches, or greater. In a further or another example, the weighted structure comprises a plurality of weighted components. The weighted components may be configured to couple to each other to achieve a desired size, shape, weight, or configuration. In some configurations, the weighted structure comprises a plurality of weighted components that may be interchangeably coupled. In one example, the weighted components may be pivotably coupled such that the relative orientation of two coupled weighted components may be modified to better conform to a use location. In a further example, the plurality of weighted components may be provided with different sizes, weights, densities, resonance frequencies, or other physical properties and/or characteristics and may be selectively coupled to customize their usage. In some embodiments, weighted components are deformable, e.g., undergo plasticity deformation or elastic deformation, to improve fitment within a channel.

According to various embodiments described herein, the weighting device may be configured to reduce degradation of sound quality attendant conventional weighting methods. For example, the weighting device may utilize filler material configured to minimize air spaces in the filler material to maximize acoustic quality, decrease vibration, and decrease unwanted resonance. Containers may be configured to be easy to fill through openings, e.g., large openings, funnel shaped openings, openings configured to attach to filler material pouring devices to easily transfer filler material, or utilizing discrete subunits to provide filler material into containers. The weighting device may be durable, sealable, and/or leakproof with respect to the filler material to better contain filler material and prevent spills within a use location. Exterior surfaces of the weighting device may be made of soft, slick, or non-abrasive materials that protect use locations, such as an inside of a speaker stand, by eliminating residue, abrasion, and friction with interfacing surfaces. The weighted device may be shaped to tailor the weighted device to particular use locations, such as speaker stands or specific brands or models of speaker stands. Embodiments utilizing subunit containers may provide a modular design to further facilitate usage with many brands using only a few SKUs. The weighting device may include a retrieve, such as a pull tab or string allowing easy insertion, removal, and manipulation of the weighting device.

Although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" refers to "x", "y", or both "x" and "y", whereas "either x or y" refers to exclusivity. Any numerical range recited herein includes all values and ranges from the lower value to the upper value. These are only examples of what is specifically intended, and all possible combinations of numerical values and ranges between and including the lowest value and the highest value enumerated are to be considered to be expressly stated in this application. Numbers modified by the term "approximately" or "about" are intended to include +/−10% of the number modified.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A weighting device for audio equipment, the weighting device comprising:
    a container dimensioned to be positioned within a channel of a vertically extending column of a speaker stand, the container having one or more sidewalls defining an interior volume containing or configured to contain a filler material comprising a liquid or slurry that is or acts as a non-Newtonian fluid that is configured to dampen vibrations produced by a speaker supported by the speaker stand when the container is positioned in the channel of the speaker stand, the container having an exterior side comprising a rubberized material, non-abrasive material, slick material, soft cloth, or non-abrading polymer material; and
    a retriever attached to the container, wherein the retriever comprises an elongate material extending or extendable from the container configured to be grasped by a user to manipulate a position of the container.

2. The weighting device of claim 1, wherein the one or more sidewalls are liquid impermeable.

3. The weighting device of claim 1, wherein the container includes an opening into the interior volume and a closure device for selectively closing and opening the opening, and wherein the closure device seals the opening when the opening is selectively closed with closure device.

4. The weighting device of claim 3, further comprising a plurality of subunit containers containing the filler material, wherein the interior volume of the container is dimensioned to receive the plurality of subunit containers through the opening to thereby contain the filler material and the subunit containers therein.

5. The weighting device of claim 1, wherein the audio equipment is a speaker stand and the use location is a channel within the speaker stand or the audio equipment is a speaker and the use location is a cavity within the speaker.

6. A weighting device for audio equipment, the weighting device comprising:
    a container dimensioned to be positioned within a channel of a vertically extending column of a speaker stand, the container comprising one or more sidewalls defining an interior volume containing a filler material, wherein the filler material comprises a liquid or slurry that is or acts as a non-Newtonian fluid that is configured to dampen vibrations produced by a speaker supported by the speaker stand when the container is positioned in the channel of the speaker stand, and the one or more sidewalls are impermeable to the filler material; and
    an outer casing having an interior volume configured to receive the container, wherein the outer casing has an exterior side comprising a rubberized material, non-abrasive material, slick material, soft cloth, or non-abrading polymer material.

7. The weighting device of claim 6, wherein the container includes an opening into the interior volume and a closure device for selectively closing and opening the opening, and wherein the closure device seals the opening when the opening is selectively closed with closure device.

8. The weighting device of claim 7, further comprising a plurality of subunit containers containing the filler material, wherein the interior volume of the container is dimensioned to receive the plurality of subunit containers through the opening to thereby contain the filler material and the subunit containers therein.

9. The weighting device of claim 8, further comprising a retriever attached to the outer casing, wherein the retriever comprises an elongate material extending or extendable from the outer casing configured to be grasped by a user to manipulate a position of the weighting device.

10. The weighting device of claim 9, wherein the elongate material comprises an extendable tab or string.

11. The weighting device of claim 10, wherein the audio equipment is a speaker stand and the use location is a channel within the speaker stand or the audio equipment is a speaker and the use location is a cavity within the speaker.

12. A method of weighting audio equipment, the method comprising:
    positioning a weighting device within a channel of a vertically extending column of a speaker stand, the weighting device comprising:
        a container comprising one or more sidewalls defining an interior volume containing a filler material, wherein the filler material comprises a slurry or liquid that is or acts as a non-Newtonian fluid that is configured to dampen vibrations produced by a speaker supported by the speaker stand when the container is positioned in the channel of the speaker stand, wherein the one or more sidewalls are impermeable to the filler material; and
        an outer casing having an interior volume configured to receive the container, wherein the outer casing has an exterior side comprising a rubberized material, non-abrasive material, slick material, soft cloth, or non-abrading polymer material.

13. The weighting device of claim 12, wherein the container includes an opening into the interior volume and a closure device for selectively closing and opening the opening, and wherein the closure device seals the opening when the opening is selectively closed with closure device.

14. The weighting device of claim 13, further comprising a plurality of subunit containers containing the filler material, wherein the interior volume of the container is dimensioned to receive the plurality of subunit containers through the opening to thereby contain the filler material and the subunit containers therein.

15. The weighting device of claim 14, further comprising a retriever attached to the outer casing, wherein the retriever comprises an elongate material extending or extendable from the outer casing configured to be grasped by a user to manipulate a position of the weighting device.

16. The weighting device of claim 15, wherein the elongate material comprises an extendable tab or string.

17. The weighting device of claim 16, wherein the audio equipment is a speaker stand and the use location is a channel within the speaker stand or the audio equipment is a speaker and the use location is a cavity within the speaker.

\* \* \* \* \*